(No Model.)
P. W. LEFFLER.
DOUBLE TREE.
No. 327,180. Patented Sept. 29, 1885.
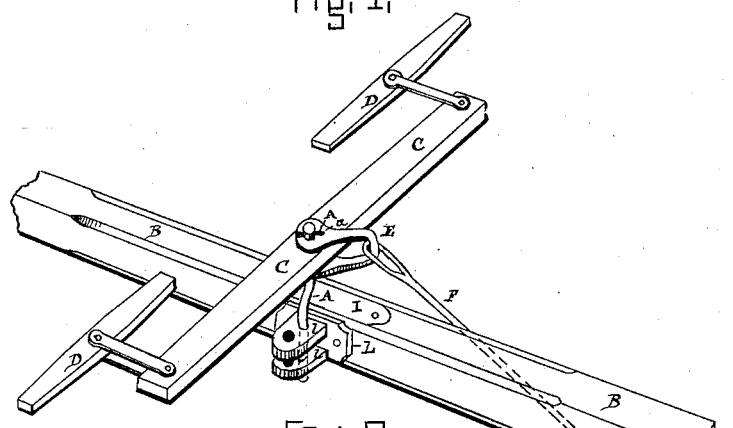
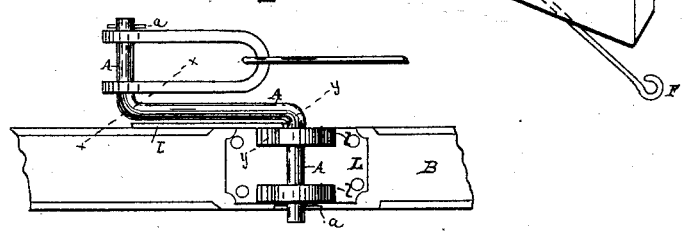
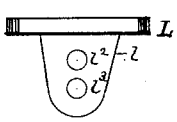
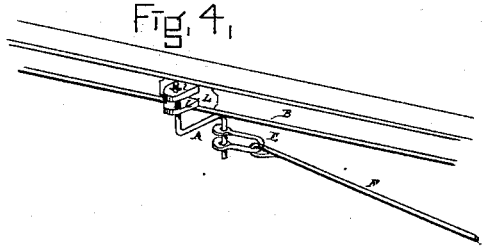
WITNESSES:
Hartthorn White
Geo. H. Sonneborn
INVENTOR
Paul W. Leffler
BY Wm. G. Button
his
ATTORNEY
N. PETERS, Photo-Lithographer, Washington, D. C.

UNITED STATES PATENT OFFICE.

PAUL W. LEFFLER, OF GRINNELL, IOWA, ASSIGNOR TO CRAVER, STEELE, & AUSTIN, OF SAME PLACE.

DOUBLE-TREE.

SPECIFICATION forming part of Letters Patent No. 327,180, dated September 29, 1885.

Application filed August 17, 1885. (No model.)

*To all whom it may concern:*

Be it known that I, PAUL W. LEFFLER, a resident of Grinnell, Poweshiek county, State of Iowa, have invented a new and useful Improvement in Double-Tree Pivots, of which the following is a specification.

My invention has for its object to provide a double-tree pivot that will permit of adjustment to correct side draft and allow for the varying sizes of the draft-animals, and the condition of the ground, weight of grain, and other causes which modify the draft.

My device is more especially adapted for use on mowing-machines, but it can evidently be used upon various kinds of agricultural machinery.

My invention consists of a plate carrying a pair of ears attached to the pole of a mowing-machine or other vehicle or machine, these ears being provided each with two holes, and a double-bent crank-pin passing through the clevis to which the draft-rod is attached at one end, and at the other passing through either of the holes in the ears.

In the drawings, Figure 1 is a perspective view of the device attached to the pole and double and single trees. Fig. 2 is a side view of the device, showing the shape of the double-tree pin. Fig. 3 is a top view of the casting having the ears. Fig. 4 is a perspective view of the device attached to a pole when placed beneath it. The double-tree is omitted, but draft-rod is shown.

A is the double-tree pin bent twice at right angles on the lines $x$ $x$ and $y$ $y$.

$a$ $a$ are cotters.

B is the pole of the mowing-machine or other machine or vehicle; C, double-tree; D D, single-trees; E, clevis; F, draft-rod; I, a friction-plate upon the pole; L, plate carrying ears $l$ $l$, in the holes of which one end of the bent pin A rests; $l^2$, inner hole in ear $l$; $l^3$, outer hole in ear $l$.

The plate L is bolted or screwed to the side of the pole of the mowing-machine, and the plate I, which is merely a friction-plate upon which the horizontal or middle portion of the pin can slide, is screwed to the top or bottom of the pole. (Preferably there should be one in each place.) The lower end of the pin A is passed through the opposite holes on both ears $l$ $l$ of the plate L and secured by a cotter. The horizontal portion will now rest upon the plate I. The upper end is then passed through the holes of the clevis and the double-tree. The draft-rod being attached to the clevis in the usual manner, a cotter is put in the top of the pin above the clevis to secure it.

When the animals are smaller or the peculiarities of the draft require it, the pin can be inserted in the reverse position, as shown in Fig. 4, bringing the double-tree under the pole.

In very heavy grain, to avoid side draft, the pin may be placed in the outer holes of the plate L, and it may also be so placed when the double-tree is beneath the pole.

Having now fully described my invention, what I claim, and desire to secure by Letters Patent, is—

1. A double-tree pivot bent twice at right angles, one end being adapted to carry a double-tree and a clevis for draft-rod, while the other end is supported by ears attached to the side of the pole, the said ears having two or more holes for the pivot to permit of adjustment for varying draft, all substantially as shown and described.

2. In a double-tree pivot, the combination of the pivot A, bent as shown, the supporting-ears $l$ $l$, provided with one or more holes, $l^2$ $l^3$, and secured to a tongue or pole, B, substantially as shown and described.

3. In a double-tree pivot, the combination of the pivot A, bent as shown, the supporting-ears $l$ $l$, attached to the side of pole B, and the friction-plate I, all substantially as shown and described.

In witness whereof I have hereunto set my hand this 1st day of August, A. D. 1885.

PAUL W. LEFFLER.

Witnesses:
JOHN G. PETTIT,
RUFUS RICKER.